United States Patent
Edelstein

(12) 
(10) Patent No.: US 6,375,713 B1
(45) Date of Patent: Apr. 23, 2002

(54) USE OF CUPRIC CHLORIDE ETCHANT SOLUTION IN A SOLVENT EXTRACTION ELECTROWINNING COPPER REFINERY

(75) Inventor: Philip Edelstein, Briarcliff Manor, NY (US)

(73) Assignee: Phibrotech, Inc., Briarcliff Manor, NY (US)

( * ) Notice: Subject to any disclaimer, the term of this patent is extended or adjusted under 35 U.S.C. 154(b) by 0 days.

(21) Appl. No.: 09/734,706

(22) Filed: Dec. 13, 2000

(51) Int. Cl.⁷ .................................................. C23C 1/12
(52) U.S. Cl. ......................... 75/743; 205/581; 205/582; 205/586
(58) Field of Search ................................ 205/581, 582, 205/586; 75/743

(56) References Cited

U.S. PATENT DOCUMENTS 5,820,653 A * 10/1998 Eamon et al. ................. 75/743
6,165,344 A * 12/2000 Green et al. ................. 205/581

* cited by examiner

*Primary Examiner*—Melvyn Andrews
(74) *Attorney, Agent, or Firm*—Nixon & Vanderhye

(57) ABSTRACT

Process for improving recovery of copper and reducing raw material costs, from a copper-containing source by SX-EW. The process comprises the steps of mixing an acidic copper-containing PLS obtained by leaching a copper-containing source with an acidic leachant, usually sulfuric acid, with an aqueous acidic cupric chloride solution spent printed wire board etchant, to produce an acidic cupric chloride/copper sulfate-containing mixture. This mixture is subjected to SX-EW to recover the copper as copper cathode.

18 Claims, No Drawings

USE OF CUPRIC CHLORIDE ETCHANT SOLUTION IN A SOLVENT EXTRACTION ELECTROWINNING COPPER REFINERY

The present invention relates generally to recovery of acid soluble copper by extraction from copper-containing ores. More specifically, the present invention provides a process for extracting copper using spent acidic cupric chloride etchant solution from printed wire board manufacture as a raw material source of copper and acid using standard solvent extraction (SX) and electrowinning (EW) processes.

BACKGROUND OF THE INVENTION

Copper is obtained by mining acid soluble copper-containing ore and piling the collected ore into a heap at the surface of the mine. Copper refining to produce high quality copper cathode is generally carried out in three steps known as acid leaching, followed by solvent extraction (SX) and then electrowinning (EW).

In the acid leaching step, an acid leach solution, generally sulfuric acid, is sprayed over the heap so that the leach solution flows through the heap dissolving copper in the ore and forming a copper-containing solution (copper sulfate). The copper laden solution, collected at the bottom of the pile, contains approximately 0.5–15 g/L, copper more usually 1–5 g/L copper, and is called (acidic) pregnant leach solution (PLS).

PLS is transferred to the SX process, which utilizes a liquid organic based ion-exchange extractant, selective for copper, in a solvent that is substantially immiscible in the aqueous solution. The PLS and copper depleted organic extractant phase (commonly referred to as the barren organic phase) are typically mixed together in a large agitated tank and then transferred to a settler where the pregnant or copper loaded organic and barren or copper depleted aqueous phases are allowed to separate to form an upper copper-loaded organic phase and a lower copper-depleted acidic aqueous raffinate phase. The lower aqueous raffinate phase is removed from the settler and is typically recycled and used as a leachant again to leach copper from the ore in the heap.

The loaded organic phase is transferred to a second mixer and mixed with acidic lean electrolyte which is obtained from a downstream EW plant. The mixture is transferred to a second settler and the organic and aqueous phases are allowed to separate. The lean electrolyte (25–45 g/L copper, for example 30–40 g/L copper), which is typically a highly acidic sulfuric acid stream, extracts the copper from the loaded organic phase and forms a rich copper electrolyte aqueous phase. The copper rich electrolyte (55–80 g/L, for example 60–70 g/L copper) phase is transferred to the EW plant to produce the copper cathode final product. Depleted electrolyte from the EW plant, termed lean electrolyte, is recycled and mixed with the loaded organic phase again in the mixer and settler to extract the copper from the loaded organic phase. In the mixer/settler operations, the loaded organic phase, after contact with the lean electrolyte becomes depleted of the extracted copper, and this organic phase is typically termed the stripped or barren organic phase, and this phase is typically recycled to the first mixer to contact and extract copper from new PLS.

A need exists for improving the SX process for extracting copper with reduced cost, reduced mine waste and better utilization of capital and raw material resources. The present invention seeks to fill that need.

SUMMARY OF THE INVENTION

It has now been discovered according to the present invention that it is possible to improve the yield of copper without additional ore mining and with little capital expense while at the same time reducing purchased sulfuric acid use. The present inventor has discovered surprisingly that it is possible, in a SX-EW process, to obtain improved recovery of copper using spent acidic cupric chloride etchant solution from printed wire board manufacture as a source of copper and acid. The copper present in the spent acidic printed wire board etchant is also recovered, thereby increasing the overall yield of copper in the SX-EW process, whilst the presence of hydrochloric acid in the spent cupric chloride etchant reduces the amount of additional purchased sulfuric acid required which must be added to the leaching process, thereby reducing costs.

In one aspect, the present invention provides a process for the recovery of copper from a copper containing source by SX-EW, wherein a PLS obtained by acid leaching a copper-containing source, is mixed with aqueous acidic cupric chloride to produce a copper-containing SX-EW feedstock for the production of copper cathode.

DETAILED DESCRIPTION OF THE INVENTION

The present invention resides in the surprising discovery that it is possible, in a SX-EW process, to obtain increased yields of extracted copper using an acid-containing spent cupric chloride etchant solution obtained from printed wire board manufacture. More particularly, it has been discovered, according to the present invention, that acidic cupric chloride etchant solution is an effective substitute for sulfuric acid in acid leaching, and provides a higher concentration PLS copper raw material without additional mining, thus significantly reducing mine waste, as well as a costs associated with supplying additional purchased acid in the acid leaching step.

The spent cupric chloride etchant solution is typically ammonium-free, and contains hydrochloric acid. More usually, the acidic spent cupric chloride etchant contains 0–8% by volume hydrochloric acid, for example 1–8% by volume, more usually 2–6% by volume, and contains approximately 150 times more copper than typical PLS employed in the prior art process. The spent acidic cupric chloride etchant employed according to the present process is therefore an excellent raw material source of copper and acid, providing increased copper concentration of the PLS as a result of copper present in the spent acidic printed wire board etchant solution.

In a first step, an aqueous mixture of fresh sulfuric acid, recycled SX process raffinate and other solutions recycled from the mine site are sprayed over the heap of mined copper-containing ore so that the solution flows through the heap dissolving (leaching) copper in the ore and forming a copper-containing solution. The copper-laden solution (PLS) is collected at the bottom of the heap leach pile, and contains approximately 0.5–15 g/L, typically 1–5 g/l copper.

The PLS is transferred to the SX process, which utilizes a conventional liquid organic based ion-exchange extractant, selective for copper. Acidic spent cupric chloride etchant, typically containing 150–180 g/l copper, more usually 160–170 g/l copper, is mixed with PLS at ambient temperature and pressure just prior to transfer to the SX process, to give an acidic cupric chloride/copper sulfate mixture (ACCS). The addition of the spent cupric chloride etchant at this point in the process typically increases the copper content of the PLS by about 1–40 weight %, for example 4–35 weight %, more usually 10–30 weight %, over conventionally produced PLS.

The organic liquid extractant employed in the SX process and the aqueous liquid are not miscible. Thus, upon settling, the two liquids will separate to form two different phases, a copper-free acid phase and an organic copper-containing phase.

The copper-free acid phase is removed from the SX process and returned to the acid leaching process for reuse in dissolving more copper ore. Typically, the copper-free acid phase is mixed with purchased sulfuric acid and other solutions recycled from the mine site and then sprayed directly onto the copper-containing ore as the leachant. The term "copper-free" means that the phase is free or substantially free of copper, since the extractant typically does not remove all of the copper.

The sulfuric acid reacts with other minerals in the ore, so that not all of the acid is recovered by the SX process. Since the spent acidic cupric chloride printed wire board etchant solution enters the copper refining process at the SX step, the hydrochloric acid value of the spent cupric chloride etchant is recovered for re-use, and is returned to the acid leach operation, as decribed above. As such, the spent acidic cupric chloride etchant functions as a substitute for purchased sulfuric acid as well as a source of copper.

Typically, SX plants cannot use spent acidic cupric chloride etchant solution, because the EW step in copper refining has a low tolerance for any significant chloride concentration that carries over from the SX step of the copper refining process. Generally, therefore, the SX process includes one or more water wash stages, performed according to conventional procedures, to prevent or minimize chlorides from carrying over to the EW step.

The washed copper-loaded organic phase substantially free of chloride (1–100 ppm, more usually 5–75 ppm chloride ion) is contacted with lean electrolyte which strips the copper from the loaded organic phase. The copper-rich electrolyte is transferred to the EW plant to produce copper cathode in accordance with conventional procedures.

The spent acidic cupric chloride printed wire board etchant solution employed in the process of the present invention generally comprises cupric chloride and hydrochloric acid. Chlorine gas and hydrogen peroxide may also be present in low amounts. Sodium chloride and a chlorate such as sodium chlorate and/or potassium chlorate may be added, if desired. Various ratios of these chemical components are used as acid etchants in the printed wire board industry. Any of the weight ratios of the components in the spent etchant will work in the present process. It will be understood that many variations in spent etchant formulas are possible, all of which will be apparent to persons of ordinary skill in the art.

As used herein, the term "ammonium-free aqueous cupric chloride solution" means an aqueous solution of cupric chloride which contains no or substantially no ammonia or ammonium ion, such that the pH of the solution is no greater than 6, more usually in the range of 0–3, typically no greater than 1.5. Generally, the solution contains less than 0.5% by volume ammonia or ammonium ion, more usually from zero to less than 0.005% by volume ammonia or ammonium ion.

The copper etchant temperature is usually maintained in the region of ambient temperature (about 70–75° F.). Higher temperatures may be employed to accelerate the process, for example temperatures in the range of 70–130° F., more usually 80–130° F.

Any copper-containing ore may be the subject of the present process. Examples of a suitable ore are copper oxide ore, copper sulfide ore, or any other copper source. Copper oxide ore is most typically employed in the present process.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A process for the recovery of copper from a copper containing source by SX-EW, the process comprising the step of mixing a sulfuric acid based copper-containing pregnant leach solution (PLS) obtained by acid leaching a copper-containing source, with an aqueous acidic cupric chloride solution to produce a copper-containing SX-EW feedstock for the production of copper cathode.

2. A process according to claim 1, wherein said aqueous acidic cupric chloride solution is printed wire board spent etchant solution.

3. A process according to claim 1, wherein said aqueous acidic cupric chloride solution comprises hydrochloric acid.

4. A process according to claim 3, wherein said aqueous acidic cupric chloride solution further comprises sodium chloride.

5. A process according to claim 1, wherein said aqueous acidic cupric chloride solution comprises an agent selected from chlorine gas and hydrogen peroxide.

6. A process according to claim 5, wherein said aqueous acidic cupric chloride solution further comprises sodium chloride.

7. A process according to claim 1, wherein said aqueous acidic cupric chloride solution comprises hydrochloric acid and a chlorate selected from sodium chlorate and potassium chlorate.

8. A process according to claim 7, wherein said aqueous acidic cupric chloride solution further comprises sodium chloride.

9. A process according to claim 1, wherein said aqueous acidic cupric chloride solution contains 0–8% by volume hydrochloric acid.

10. A process according to claim 1, wherein said aqueous acidic cupric chloride solution is ammonium-free.

11. A process according to claim 1 wherein said feedstock produced by mixing said PLS with said aqueous acidic cupric chloride solution contains 1–40 weight % more copper over PLS produced using sulfuric acid alone.

12. A process according to claim 1, wherein said copper-containing SX-EW feedstock is contacted with an organic extractant to extract the copper and produce a copper-free acid phase and an organic copper-containing phase.

13. A process according to claim 12, wherein said copper-free acid phase is used for leaching additional copper.

14. A process according to claim 12, wherein said copper-containing phase is subjected to Electrowinning (EW) to recover copper.

15. A process according to claim 1, and further comprising at least one aqueous washing step to reduce chloride content of said feedstock prior to EW.

16. A process according to claim 1, wherein said acidic copper-containing PLS is obtained by leaching a copper-containing source with a mixture of sulfuric acid and hydrochloric acid from spent cupric chloride etchant solution.

17. A process for the recovery of copper from a copper-containing source by solvent extraction (SX) and electrowinning (EW), comprising the steps of:

mixing an acidic copper-containing PLS obtained by leaching a copper-containing source with an acidic leachant, with an aqueous acidic cupric chloride solution to produce an acidic cupric chloride/copper-sulfate containing mixture (ACCS); and subjecting the ACCS to SX to recover the copper.

18. A process for the recovery of copper from a copper-containing source by SX-EW, the process comprising the steps of:

mixing sulfuric acid copper-containing PLS obtained by sulfuric acid acid leaching of a copper-containing source with aqueous acidic cupric chloride solution to produce an acidic cupric chloride/copper-sulfate containing (ACCS) mixture;

contacting said ACCS mixture with an organic extractant to extract the copper and produce a copper-free acid phase and an organic copper-containing phase;

transferring said copper-free acid phase to said acid leaching for leaching additional copper; and subjecting said copper-containing phase to EW to recover copper.

* * * * *